United States Patent
Pothapragada et al.

(10) Patent No.: US 6,389,432 B1
(45) Date of Patent: May 14, 2002

(54) INTELLIGENT VIRTUAL VOLUME ACCESS

(75) Inventors: Srinivas Pothapragada, San Jose; Lakshman Narayanaswamy, Santa Clara; Pannala Sudhakar Reddy, San Jose; Ravi Indurkar, Santa Clara; Tarun Kumar Tripathy, Sunnyvale, all of CA (US)

(73) Assignee: Auspex Systems, Inc., Santa Clara, CA (US)

( * ) Notice: Subject to any disclaimer, the term of this patent is extended or adjusted under 35 U.S.C. 154(b) by 0 days.

(21) Appl. No.: 09/286,248

(22) Filed: Apr. 5, 1999

(51) Int. Cl.[7] ................................................ G06F 12/00
(52) U.S. Cl. .......................... 707/205; 707/104; 707/10
(58) Field of Search .......................... 707/10, 104, 205, 707/503; 711/154, 114; 345/520, 543; 709/201

(56) References Cited

PUBLICATIONS

Z. Meggyesi, "Fibre Channel Overview," downloaded from www1.cern.ch/HSI/fcs/spec/overview.htm, Mar. 16, 1999, 9 pgs.

P. Massiglia, "Fibre Channel, Storage Area Networks, and Disk Array Systems," Adaptec, Inc. Apr. 13, 1998, 22 pgs.

F. Neema, "Network Attached Storage Servers Take Storage–Centric Tiger By The Tail," downloaded from www.smsmag.com/archive/1998, Jan. 1998, 9 pgs.

Sun, Jini Technology Fact Sheet, Jan. 25, 1999, 4 pgs., downloaded from www.sun.com./storage/storex/white–papers/storex.

Sun, "Integrating Storage Hardware with Code–Named Project StoreX," A Technical Brief, 12 pgs., downloaded from www.sun.com./storage/storex/white–papers, Mar. 16, 1999.

Sun, Project StoreX (code name), 6 pgs., downloaded form www.sun/storage/storex, Mar. 16, 1999.

*Primary Examiner*—Hosain T. Alam
*Assistant Examiner*—Anh Ly
(74) *Attorney, Agent, or Firm*—Fish & Richardson P.C.

(57) ABSTRACT

A system and a method manages storage space in one or more data storage devices. This is done by receiving a request for storage space from a requester, the request specifying one or more criteria associated with the requested storage space; searching a data structure such as a table containing attributes associated with the data storage devices; selecting one of the data storage devices whose attributes best match the one or more criteria; returning an identification associated with a portion of the selected data storage devices to the requester; and creating a communication path between the requester and the selected data storage device.

43 Claims, 16 Drawing Sheets

INTELLIGENT VIRTUAL VOLUME ACCESS

BACKGROUND OF THE INVENTION

The invention relates to a system with virtual volume access and management.

Spiraling increases in processing capability have made computers indispensable in the modern world. Concurrently, information storage systems have become an important part of these computers to handle the resulting data explosion. Further, the need for a pervasive access to mission-critical data scattered among heterogeneous platforms has increased the complexity and cost of managing storage in corporate environments.

The storage and management of data have driven the development of new storage architectures—Network Attached Storage (NAS) and Storage Area Network (SAN)—to meet growing storage demand.

In a NAS, intelligent storage devices connect directly to the network and are dedicated to one function: file serving. A NAS device lets administrators attach intelligent devices to networks, which are capable of directly retrieving and transmitting information to users. In general, a NAS product functions as a server in a client/server relationship. The NAS device has its own processor, a dedicated operating system or micro kernel, and processes file I/O protocols, such as NFS, to manage the transfer of data between itself and its clients. To applications running on the network, the NAS device appears to be a server. To a client, the NAS device is a large hard disk.

In a SAN environment, the function of storage is detached from network servers and centralized and managed as a separate network resource. SANs that are based on Fibre Channel buses have recently emerged as one high performance data communications environment available today to interconnect servers and storage. Running at Gigabit speeds and built on open standards, SANs offer better scalability, fault recovery and general manageability than conventional client-server LAN based approaches.

Although SANs may be connected together in a network, SANs are typically not network aware. As such, requesters such as servers can directly access drives attached to the SAN system. However, for accesses to remote drives attached to remote SANs, the requesters have to specifically direct their requests to the remote SANs using specialized drivers or code. As such, the software has to be customized to access remote data storage devices.

With the increasing demand for storage and continually lower prices of storage, system administrators are frequently facing the challenge of seamless expansion of online storage capacity. This requirement changes the dynamics of the way the data is stored on the disk or the tape and the way the reads and writes are done on the storage devices. Thus, users are demanding better ways of maintaining the data storage system and increasing storage performance and/or capacity to meet new demands.

SUMMARY OF THE INVENTION

In one aspect, a system manages storage space in one or more data storage devices by receiving a request for storage space from a requester, the request specifying one or more criteria associated with the requested storage space; searching a data structure such as a table containing attributes associated with the data storage devices; selecting one of the data storage devices whose attributes best match the one or more criteria; returning an identification associated with a portion of the selected data storage device to the requester; and creating a communication path between the requester and the selected data storage device.

Implementations of the invention may include one or more of the following. The searching step can be performed by an external manager. The attributes of a device can be statically configured in a server. The attributes of a device can be statically configured in a switch. Each data storage device can broadcast its attributes to a manager. The manager can store the attributes in the table, or can statically configures the attributes of a device. Each data storage device can broadcast value-added services associated with the data storage device to the manager. The manager can communicate using a Fibre Channel protocol. Further, each manager can manage one or more virtual volumes on each data storage device. The requester and the data storage devices can communicate using a network protocol. The network protocol can be an Internet Protocol (IP), an Asynchronous Transfer Mode (ATM) protocol, or an in-band control protocol which may be a Small Computer System Interface (SCSI) protocol. A server can manage the data storage device and can communicate using the Fibre Channel protocol. Alternatively, a switch can manages the data storage devices. The switch can communicate using the Fibre Channel protocol. The manager can communicate with other managers over a network. In this case, the searching step includes querying one or more tables in one or more remote storage area networks over the network; returning a remote identification associated with a portion of the selected data storage devices to the requester; and accessing the portion of the selected data storage device using the remote identification. The data storage devices may be a disk drive or a tape drive. The identification can a logical unit number. The requester can be a server or another manager. The method also includes performing manager operations to allocate space. The manager operations include one operation selected from a group of commands to initialize, attach, detach, connect, bind, write, read, move, signal, query, convert, control, and callback data in a storage partition.

In another aspect, a system for responding to a request for storage space includes one or more storage area networks (SANs); one or more data storage devices coupled to the one or more SANs; a requester coupled to one of the SANS; and a manager for supervising requests for storage space. The manager being operable to receive a request for storage space from a requester, the request specifying one or more criteria associated with the requested storage space; search a data structure containing attributes associated with the data storage devices; select one of the data storage devices whose attributes best match the one or more criteria; return an identification associated with a portion of the selected data storage devices to the requester; and create a communication path between the requester and the selected data storage device.

Implementations of the invention may include one or more of the following. One or more SANs can be interconnected over a network using a router. The manager can conform to a virtual volume management protocol. The manager can control one or more virtual partitions. Further, the manager can reside on a switch, which may be a Fibre Channel switch or a network switch. One or more of the data storage devices can be coupled to the requester over the SAN or connected over a local area network, a wide area network or a storage framework such as StoreX. The manager can allocate storage space using one or more commands selected from a group of commands to initialize, attach, detach, connect, bind, write, read, move, signal, query, convert, control, and callback data in a storage partition.

Advantages of the system includes the following. The total storage capacity of all data storage devices in a network can be tapped to satisfy each application's requirements. Thus, dynamic redistribution of storage capacity among servers is possible without requiring any physical disk relocation or change in data protection characteristics. As a result, the invention provides quick and reliable access to and management of large amounts of information on-line.

The process of requesting storage space allocation is simple, and only requires a requester to submit to a SAN manager a request containing the requester's desired storage space requirement. System specific details are hidden from the requester. Once the SAN manager assigns a data storage device matching the requester's requirement, the requester directly communicates with its assigned data storage device. As such, high performance is achieved without overhead. In this manner, the invention provides a simple way to connect applications with an impromptu and expandable storage space.

Moreover, the resulting data storage system is simple to set up, expand, and manage. For instance, additional data storage devices may be easily added to without requiring a network administrator to load drivers and configure systems. The manager can be configured from a host processor, which provides a single point of administration for system utilities and tools, including monitoring and tuning software. As such, the invention supports enhanced system expansion, modularity, and configuration flexibility.

Other features and advantages will be apparent from the following description and the claims.

BRIEF DESCRIPTION OF THE DRAWINGS

The invention will be described with respect to particular embodiment thereof, and reference will be made to the following drawings.

DESCRIPTION

Figure 1:
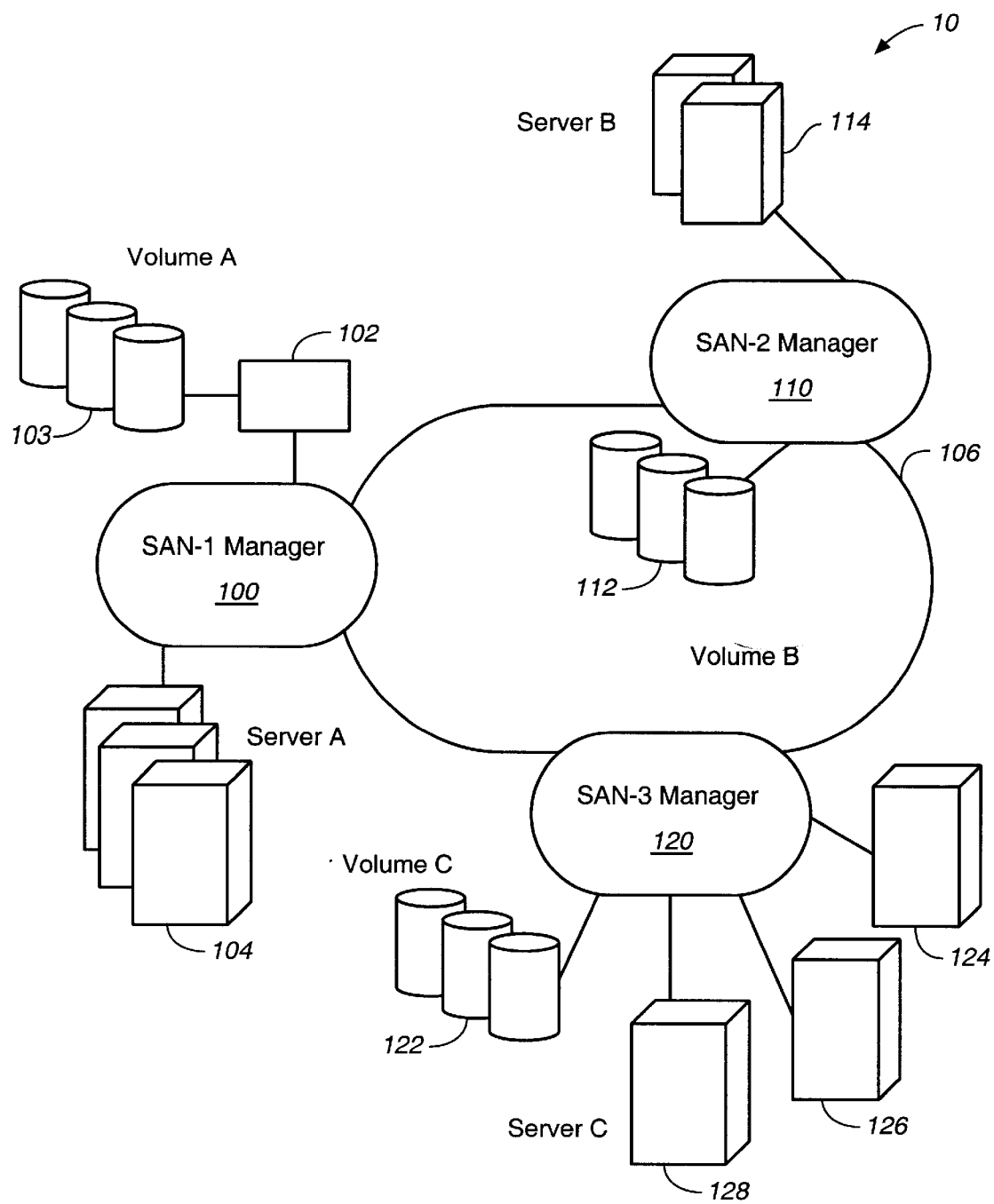
FIG. 1 is a diagram illustrating a networked system.

Referring now to FIG. 1, a networked computer system 10 is shown. The system 10 has a plurality of SANs 100, 110 and 120. Each of SANs 100, 110 and 120 is a high-speed subnet that establishes a direct connection between heterogeneous storage resources and servers. Thus, the SAN 100 is connected to a controller 102 which drives a plurality of data storage devices 103. The SAN 100 is also connected to various servers 104.

Similarly, the SAN 110 is attached to a plurality of data storage devices 112 and servers 114, while the SAN 120 is attached to data storage devices 122 and servers 124, 126 and 128. The SANs 100, 110 and 120 in turn are linked over a network 106 using a suitable router. As each of the SANs 100, 110 and 120 serves as an extended and shared storage bus over the network 106, data storage devices are accessible to all servers within the network.

Figure 2:
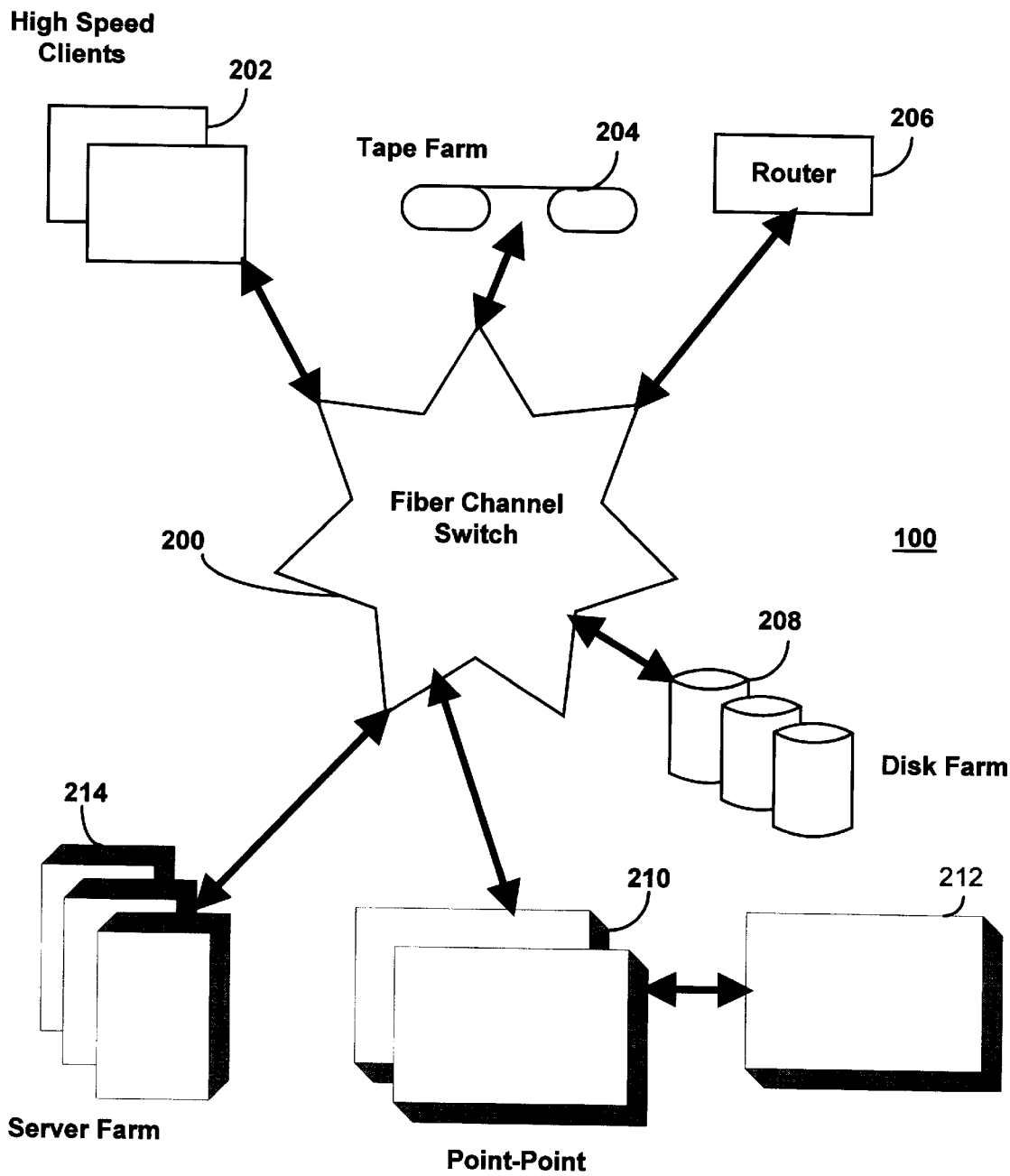
FIG. 2 is a diagram illustrating one SAN in the networked system of FIG. 1.

Referring now to FIG. 2, the SAN 100, which is similar to the SANs 110 and 120, is shown in more detail. In FIG. 2, the SAN 100 communicates over a bus called Fibre Channel using a Fibre Channel switch 200. The Fibre Channel provides a common transport vehicle for existing channel protocols like Intelligent Peripheral Interface (IPI), Small Computer System Interface (SCSI), and High-Performance Parallel Interface (HIPPI), while offering the characteristics of a framing type protocol.

The Fibre Channel switch 200 may be connected to one or clients 202, which may be applications running on workstations. The Fibre Channel switch 200 may also be connected to one or more near-online devices such as a tape farm 204. Other near-online devices cover optical jukeboxes and robotic tape silos. These devices offer very large capacities which are typically measured in tens or hundred of gigabytes, or even terabytes. However, data access times are slower. Offline storage devices typically consist of tape and optical disk devices used for backup and destined for long-term off-site data storage archiving. A large variety of devices are available for offline storage. While these devices provide the lowest dollar per megabyte cost of capacity in the data storage hierarchy, retrieval of needed data is typically difficult and time-consuming.

To communicate with other LANs and WANs, the Fibre Channel switch 200 is also connected to a router 206. The router 206 can be a special-purpose computer (or software package) that handles the connection between 2 or more networks. The router 206 examines the destination addresses of the packets passing through it and decides which route in the network to send them on.

Additionally, one or more data storage devices such as a disk farm 208 may be connected to the Fibre Channel switch 200. A number of different data storage devices may be attached to the SAN 100. For instance, on-line devices such as magnetic and optical disks may be used. The most popular configuration of on-line devices today is the RAID (Redundant Array of Independent Disks) disk array which can provide enhanced performance, fault tolerance, efficiency and reliability, among others. For example, concurrent access of multiple drives reduces the average rotation time (latency) compared to a single drive. As an example, writing a block of data to N different areas on one large disk requires N spindle rotations to store the data. The same task can be completed on N disks in an array with one rotation. In all RAID installations, parity check data is also stored (either striped across the disks or on a dedicated disk in the array). This check data can be used to rebuild "lost" data in the event of a failed disk drive. Further fault tolerance can be achieved through the "hot swap" replacement of a failed disk with a new disk operation without powering down the RAID array.

One or more point-to-point connections 210, which communicate with a remote node 212 may be connected to the Fibre Channel switch 200. Additionally, a server farm 214 may be connected to the Fibre Channel switch 200. The server farm 214 may be one or more computers or software packages that provide various services to client software running on other computers. The farm 214 may include software, such as a WWW servers, or machines on which the software is running. Moreover, a single server machine could have several different server software packages running on it, thus providing many different servers to clients on the network.

Figure 3:
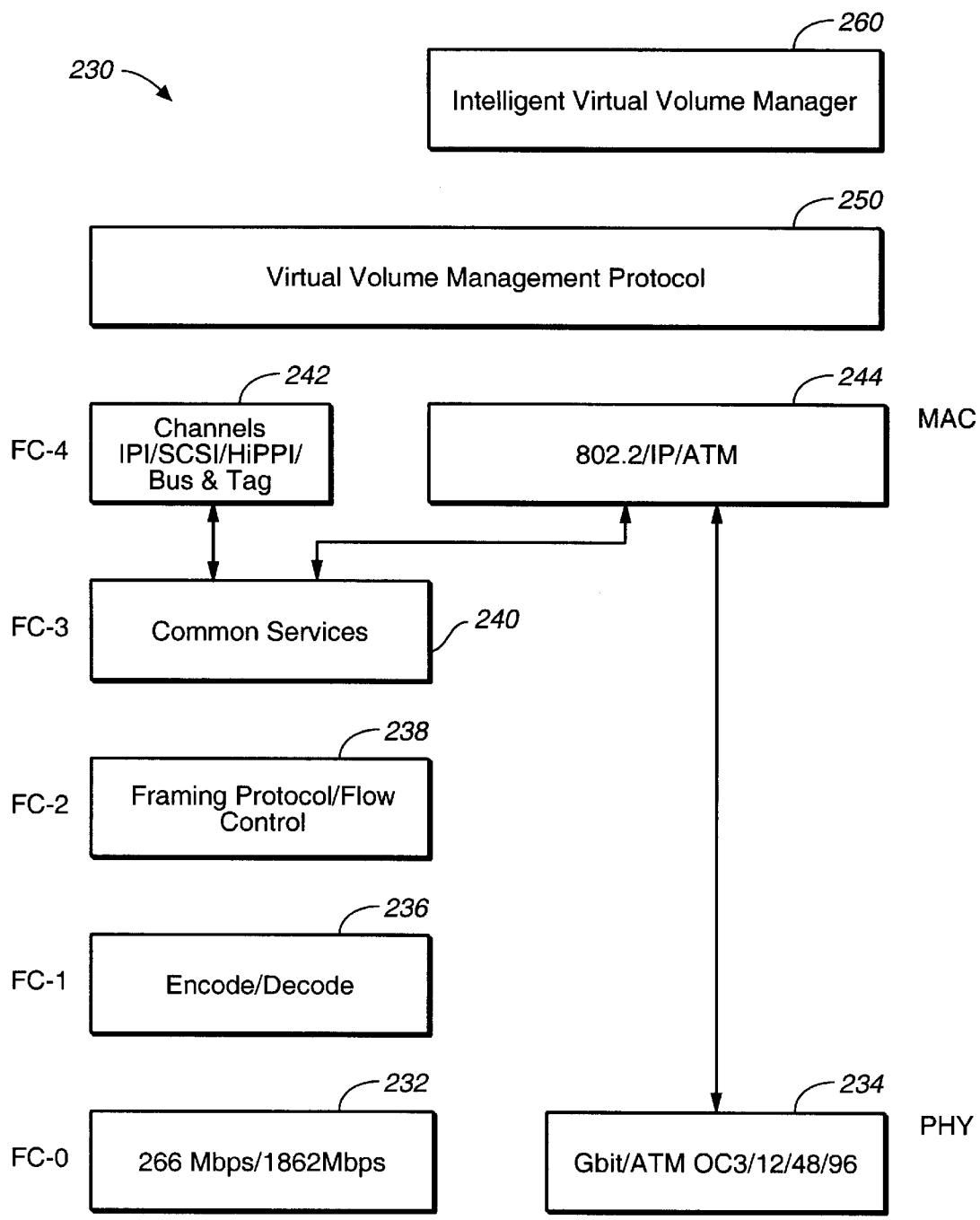
FIG. 3 is a diagram illustrating protocol layers in Fibre Channel communications.

Turning now to FIG. 3, a diagram illustrating protocol layers in Fibre Channel communications is shown. A Fibre Channel bus operates at a wide variety of speeds (133 Mbit/s, 266 Mbit/s, 530 Mbit/s, and 1 Gbits/s) and on three types of both electrical and optical media. Data is transferred using a set of hierarchical functions. The lowest level (FC-0) defines the physical link in the system, including the fibre, connectors, optical and electrical parameters for a variety of data rates. At the FC-0 level, an electrical function 232 is capable of transmitting data at 1862 Mbps and an optical function 234 is capable of transmitting data at a Gigabit rate.

FC-1 defines the transmission protocol in an encode/decode function 236 including serial encoding and decoding rules, special characters and error control. The information transmitted over a fibre is encoded 8 bits at a time into a 10 bit Transmission Character. The primary rationale for use of a transmission code is to improve the transmission characteristic of information across a fibre. The Transmission Characters ensure that short run lengths and enough transitions are present in the serial bit stream to make clock recovery possible.

The Signaling Protocol (FC-2) level serves as the transport mechanism of Fibre Channel. In a framing protocol/flow control function 238, the framing rules of the data to be transferred between ports, the different mechanisms for controlling the three service classes and processes for managing the sequence of a data transfer are defined by FC-2.

The basic building blocks of a FC connection are the Frames. The Frames contain the information to be transmitted (Payload), the address of the source, and destination ports and link control information. Frames are broadly categorized as Data frames and Link_control frames. Data frames may be used as Link_Data frames and Device_Data frames, link control frames are classified as Acknowledge (ACK) and Link_Response (Busy and Reject) frames. The primary function of the Fabric is, to receive the Frames from the source port and route them to the destination port. It is the FC-2 layer's responsibility to break the data to be transmitted into Frame size, and reassemble the Frames.

Each Frame begins and ends with a Frame Delimiter. The Frame Header immediately follows the SOF delimiter. The Frame Header is used to control link applications, control device protocol transfers, and detect missing or out of order Frames. An optional header may contain further link control information. A maximum 2112 byte long field (payload) contains the information to be transferred from a source N_Port to a destination N_Port. The 4 bytes Cyclic Redundancy Check (CRC) precedes the EOF delimiter. The CRC is used to detect transmission errors.

Flow control is the FC-2 control process to pace the flow of Frames between N_Ports and between an N_Port and the Fabric to prevent overrun at the receiver. Flow control is dependent upon the service classes. Class 1 Frames use end-to-end flow control, class 3 uses only buffer-to-buffer, class 2 Frames use both types of flow control.

Flow control is managed by the Sequence Initiator (source) and Sequence Recipient (destination) Ports using Credit and Credit_CNT. Credit is the number of buffers allocated to a transmitting Port. The Credit_CNT represents the number of data frames which have not been acknowledged by the Sequence Recipient. The end-to-end flow control process paces the flow of Frames between N_Ports. In this case, the Sequence Recipient is responsible for acknowledging the received valid data Frames by ACK Frames. When the number of receive buffers are insufficient for the incoming Frame, a "Busy" Frame is sent to the Initiator Port. Additionally, when a Frame with error is received a "Reject" Frame will be sent to the Initiator Port. The Sequence Initiator is responsible for managing EE_Credit_CNT. The N_Port login is used to establish EE_Credit.

The buffer-to-buffer flow control is managed between an N_Port and an F_Port or between N_Ports in point-to-point topology. Each port is responsible for managing BB_Credit_CNT. BB_Credit is established during the Fabric Login. The Sequence Recipient (destination) Port signals by sending a Receiver_Ready primitive signal to the transmitting Port whether it has free receive buffers for the incoming Frames.

The FC-3 level of the FC standard is intended to provide a common services function 240 required for advanced features such as:

Striping—To multiply bandwidth using multiple N_ports in parallel to transmit a single information unit across multiple links.

Hunt groups—The ability for more than one Port to respond to the same alias address. This improves efficiency by decreasing the chance of reaching a busy N_Port.

Multicast—Multicast delivers a single transmission to multiple destination ports. This includes sending to all N_Ports on a Fabric (broadcast) or to only a subset of the N_Ports on a Fabric.

FC-4, the highest level in the FC structure defines the application interfaces that can execute over Fibre Channel. It specifies the mapping rules of upper layer protocols using the FC levels below. Fibre Channel is equally adept at transporting both network and channel information and allows both protocol types to be concurrently transported over the same physical interface using a channel function 242 and a network function 244. The following network and channel protocols may be supported: Small Computer System Interface (SCSI); Intelligent Peripheral Interface (IPI); High Performance Parallel Interface (HIPPI) Framing Protocol; Internet Protocol (IP); ATM Adaptation Layer for computer data (AAL5); Link Encapsulation (FC-LE); Single Byte Command Code Set Mapping (SBCCS); and IEEE 802.2

A virtual volume management protocol (VVMP) 250 may exist above the FC-4 layer. The VVMP protocol may operate either on Fibre Channel or a LAN/WAN connection. The VVMP protocol can have features similar to LAN/WAN features such as NHRP, Shortest Path, SNMP query, and discovery, among others. Additionally, IVVM (Intelligent Virtual Volume Manager) can also work with a framework called Storex, available from Sun Microsystems, Inc. of Mountain View, Calif. A sample VVMP is shown in Appendix A.

A virtual volume manager 260 communicates with storage managers and data storage devices connected to the SAN. The virtual volume manager 260 also manages requests between requesters such as servers and data storage devices connected to the SAN. Generally, each data storage device uses a process known as discovery during its boot-up to register with the manager. Each volume manager broadcasts volume attributes periodically or in case of a query. The SAN manager will then register the volume. When a particular server requests a particular volume with specified characteristics, the SAN manager allocates the storage depending on the parameters requested by the server. When all the storage in the SAN is exhausted, the SAN manager can now query other SANs to request the storage. Alternatively, the attributes of a device may be statically configured in a server or in a switch.

Once registered, the data storage device places itself in a lookup table of the SAN manager. The lookup table can store not only pointers to the data storage devices on the network, but also value added code associated with these services. For example, when a data storage device registers with the lookup table, it loads its driver or an interface to the driver into the lookup table. When a requester requests storage space, the manager can assign a logical unit (LUN) to a portion of the data storage device. Additionally, driver and driver interface may be downloaded from the lookup table to the requester. The data storage device may also load other value-added services into the lookup table.

Volume attributes are determined and broadcasted by a storage controller in the data storage devices (if present). First, the storage controller checks whether it is in a power-up mode and if so, performs a synopsis of its relative parameters and broadcasts the parameters to a volume manager. Upon receipt of a storage space reservation request, a determination of whether space is available on the storage device (either locally or remotely) is done and if space is available, a block of storage space is reserved and assigned to a logical unit number (LUN).

In the volume manager, upon receiving a request for storage space from a requester such as a server, the volume manager looks up characteristics of the request and compares and locates the best matching drive by reviewing volume characteristic information stored in a table. If a local drive has sufficient space, a portion of a local drive is allocated and assigned a LUN. The volume manager then commands the SAN switch to directly connect the requester to the data storage device associated with the LUN or will request the SAN manager to do it.

If a local drive cannot satisfy the request, the network is queried by the volume manager to identify whether a remote storage device residing on a SAN, LAN/WAN or a storage framework can satisfy the request. If a remote source device can satisfy the request for space, a logical unit is assigned by a remote SAN manager and returned to a requester. VVMP operations may then be used to access the remote logical unit number. Once the requester is finished, the requester can send a request to the manager to deallocate the storage space.

The manager, server, or switch may communicate with each other or with the data storage devices using a number of suitable protocols, including Fibre Channel protocol, Internet Protocol (IP), Asynchronous Transfer Mode (ATM) protocol, or an in-band control protocol such as the Small Computer System Interface (SCSI) protocol.

Figure 4:
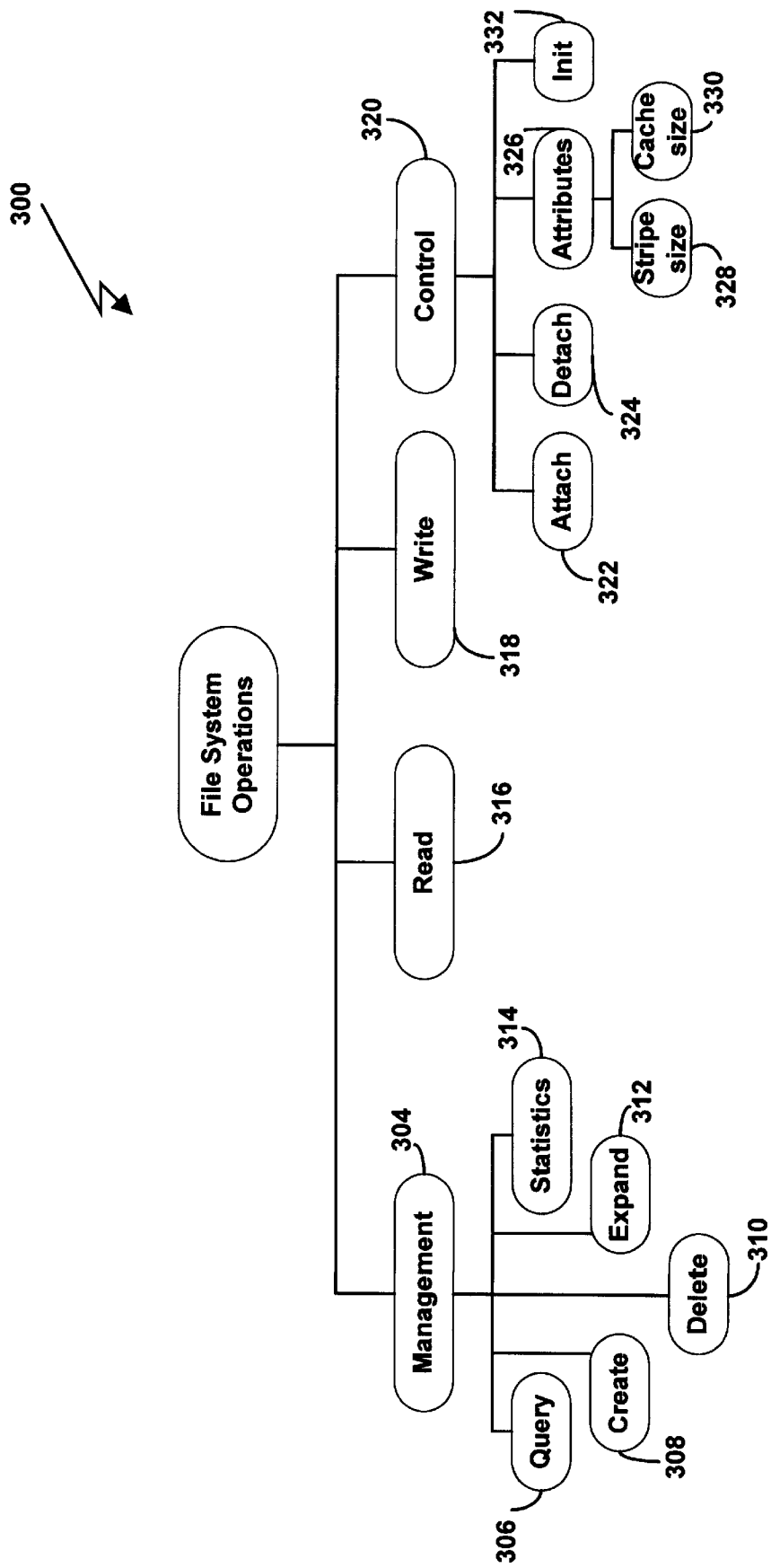
FIG. 4 is a block diagram illustrating major modules in a file system.

Turning now to FIG. 4, a block diagrams of functions available in a file system 300 is shown. The file system 300 has a plurality of modules: a management module 304, a read module 316, a write module 318, and a control module 320. The management module 304 in turn has a query function 306, a create function 308, a delete function 310, an expand function 312, and a statistics function 314. Specific details from each of functions 306–314 will be shown in more detail below. Similarly, the control module 320 includes an attach function 322, a detach function 324, an attribute function 326, and an initialization function 332. The attribute function 326 has a stripe size function 328 and a cache size function 330 which allows a user to modify or adjust the size of a RAID stripe or a cache, respectively.

Figure 5:
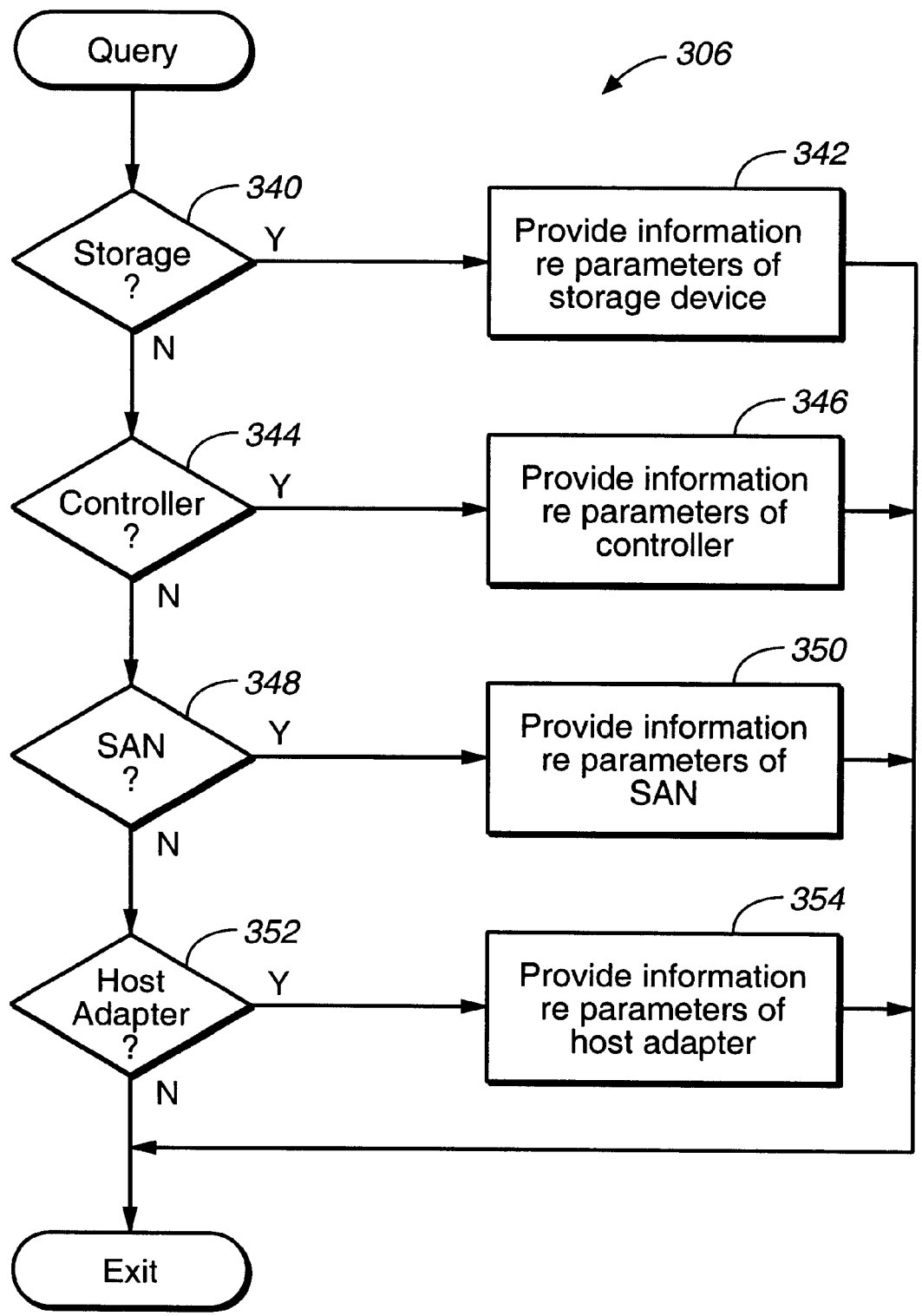
FIG. 5 is a flowchart illustrating a query function.

Referring now to FIG. 5, the query function 306 is shown in more detail. The function 306 first checks whether the target of the query is a local storage device (step 340). If so, the function 306 then provides information relating to parameters of the local storage device (step 342) and exits. From step 340, in the event that the query is not directed at a local storage device, the function 306 then checks whether the query is directed at a controller (step 344). If so, the function 306 provides information about the parameters associated with the controller (step 346). From step 344, if the query is not directed at the controller, the function 306 then determines whether the query is directed at a SAN (step 348) and if so, the function 306 provides information about the parameters associated with the SAN (step 350). Alternatively, if the query is not directed at the SAN, the function 306 then checks whether the query is directed at a host adapter device (step 352). If so, the function 306 then provides information about the parameters associated with the host adapter (step 354). Alternatively, the function 306 exits.

Figure 6:
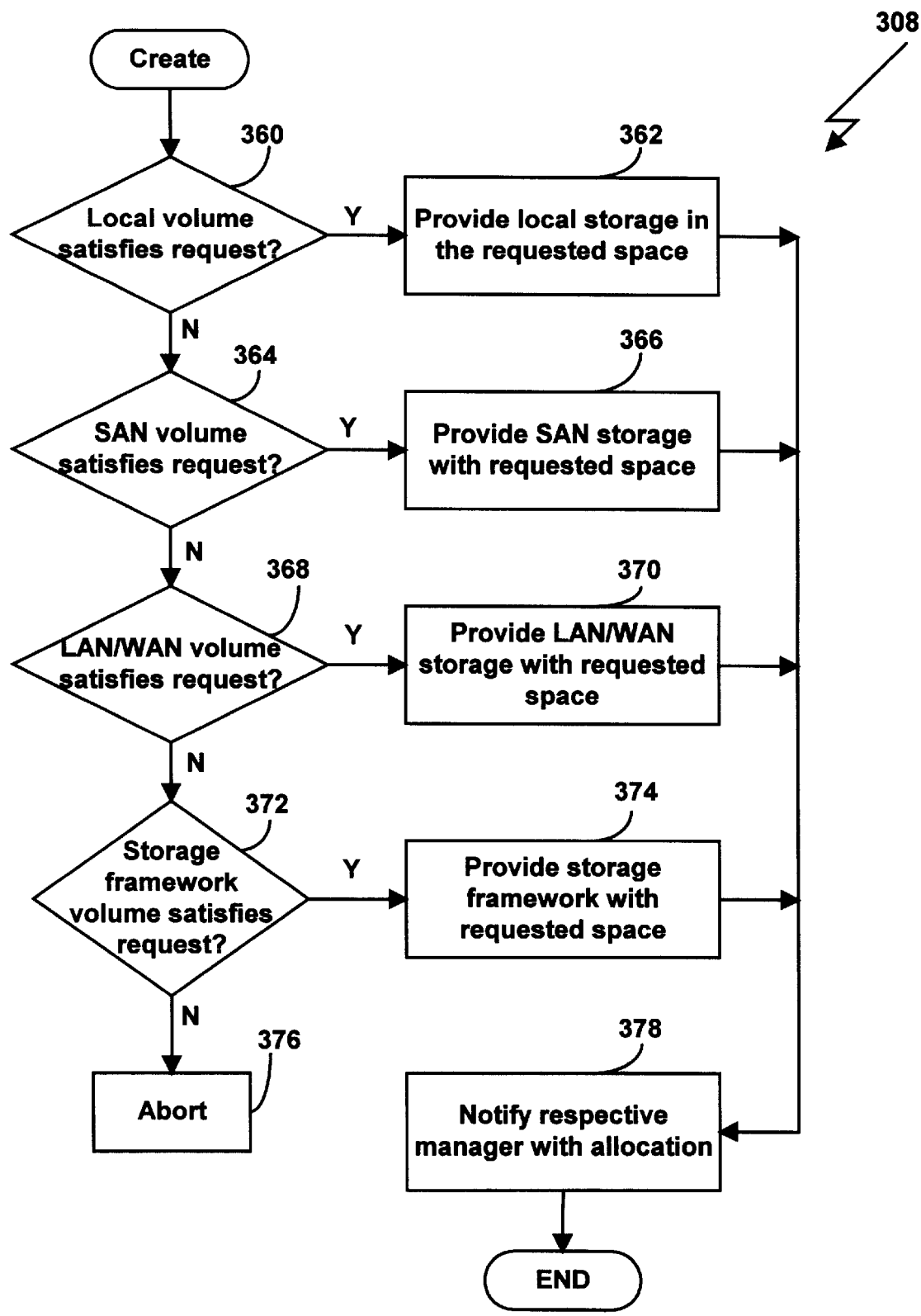
FIG. 6 is a flowchart illustrating a create function.

Referring now to FIG. 6, the create function 308 is shown. In response to a request for local storage space, the create function 308 first checks whether a local volume can satisfy the request (step 360). If so, the process allocates local space in response to the request (step 362) and notifies the local storage space manager with the allocated space (step 378).

From step 360, if a local volume cannot satisfy the space request, the create function 308 then checks whether a SAN volume can satisfy this request (step 364). If so, space is allocated on the SAN (step 366) and the SAN manager is notified of this allocation (step 378). From step 364, in the event that a SAN cannot satisfy the request, the create function 308 then checks whether a LAN/WAN volume can satisfy the request (step 368). If so, space is then allocated in the LAN/WAN storage (step 370) and the LAN/WAN manager is notified of this allocation (step 378). From step 368, if the LAN/WAN cannot satisfy this request, the create function 308 then checks whether a local storage framework volume can satisfy the space request (step 372). If not, the function 308 simply aborts (step 376). Alternatively, if space is available on the framework volume, space is allocated on the storage framework (step 374) and the storage framework manager is notified of this allocation in step 378.

Figure 7:
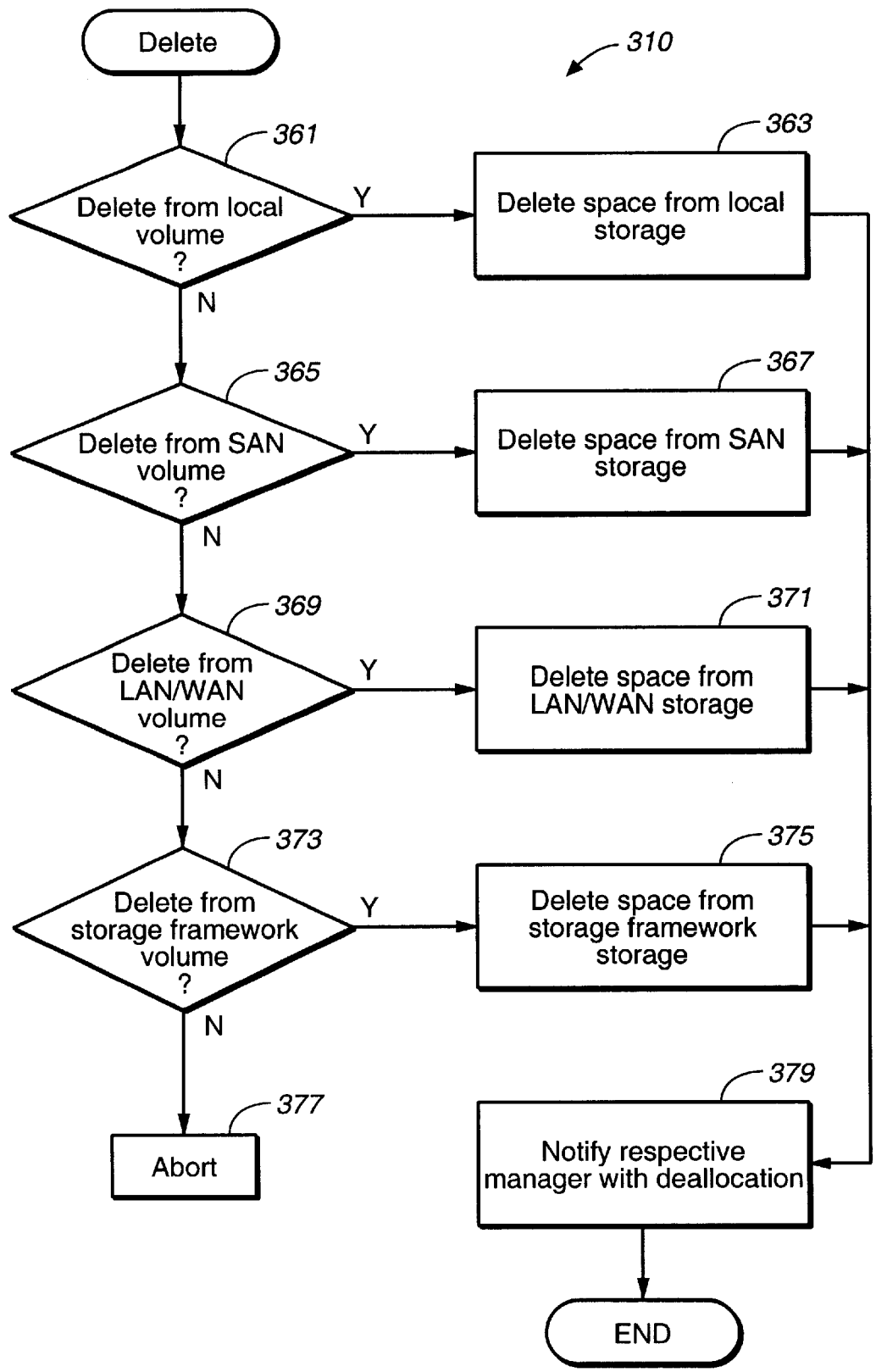
FIG. 7 is a flowchart illustrating a delete function.

Referring now to FIG. 7, the delete function 310 is shown in more detail. The delete function 310 is a counterpart of the create function 308. The delete function 310 first checks whether storage space is to be deleted from a local volume (step 361) and if so, the storage space is released back to the local storage volume (step 363). Alternatively, the delete function 310 then checks whether the deletion is to occur on a SAN volume (step 365). If so, space is deallocated on the SAN volume (step 367). Alternatively if space is to be deleted from the LAN/WAN volume (step 369), the delete function 310 deletes the space from the LAN/WAN storage (step 371). If the volume to be deleted is not resident on the LAN/WAN volume, the delete function 310 then checks whether the deletion is to occur from the storage framework volume (step 373). If so, space is deallocated from the storage framework volume (step 375). From steps 363, 367, 371, or 375, the respective local storage manager, SAN storage manager, LAN/WAN storage manager or storage framework manager is notified with the space deallocation (step 379) and then the function 310 exits.

Figure 8:
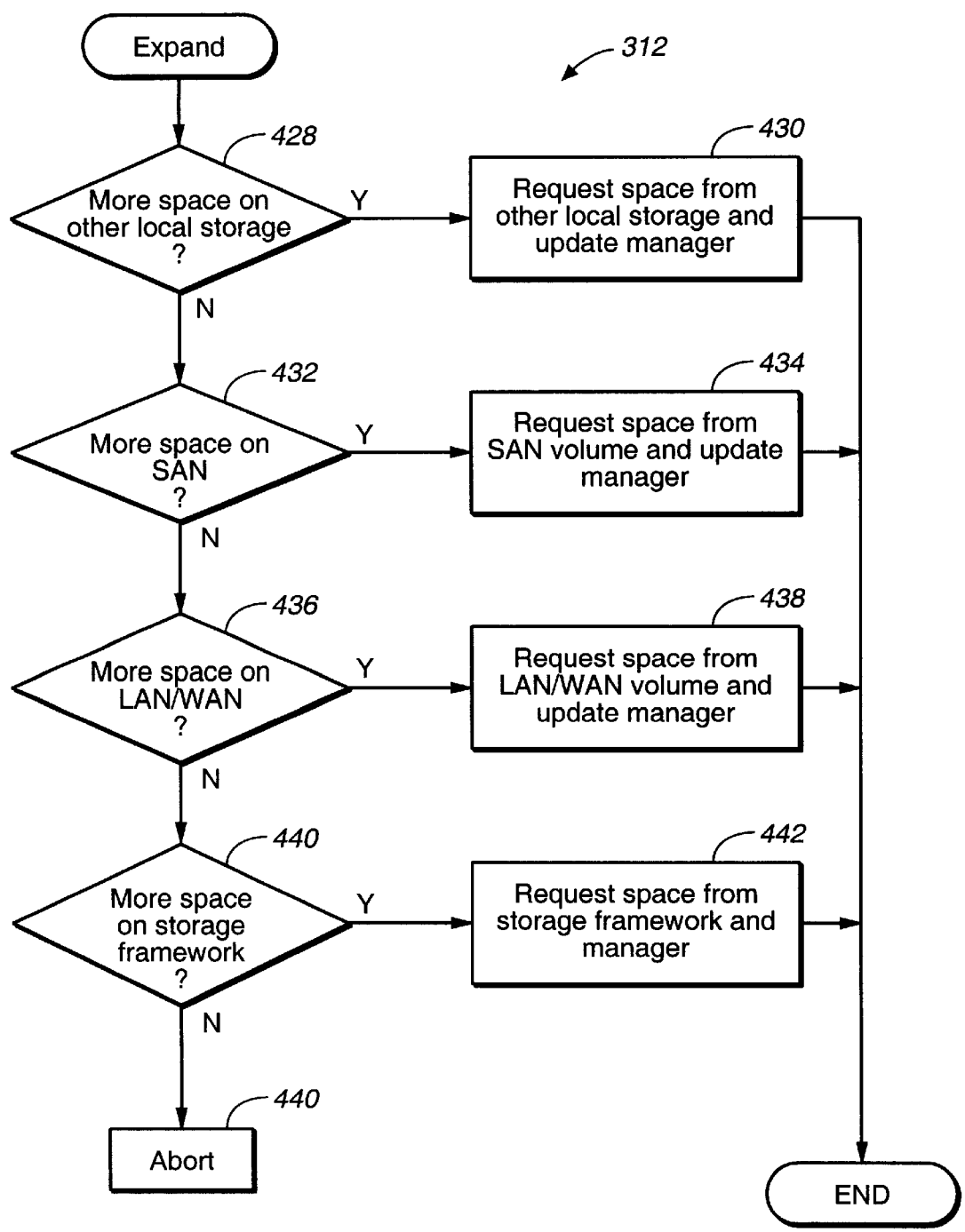
FIG. 8 is a flowchart illustrating an expand function.

Referring now to FIG. 8, the expand function 312 is shown. In response to a request to allocate more space to an existing volume, the expand function 312 first checks whether additional space is available on other local storage devices (step 428) and, if so, the expand function 312 requests storage space from one of the local storage devices and updates the local storage manager (step 430). Alternatively, if space is not available on any of the local storage devices, the expand function 312 then checks whether additional space is available on other SAN devices (step 432). If so, space is requested from the SAN volume and the appropriate SAN manager is updated (step 434).

From step 432, in the event that space is not available on either the local storage device or the SAN device, the expand function 312 then checks whether additional space is available on one of the LAN/WAN storage devices (step 436), and if so, appropriate space is allocated from the LAN/WAN devices (step 438). In this case, the LAN/WAN manager is also updated in step 438. From step 436, if space is not available on the LAN/WAN device, the expand function 312 then checks whether additional space may be available on one of the storage framework devices (step 440). If not, the expand function 312 aborts (step 441). Alternatively, space is allocated on the storage framework device and the storage framework manager is updated (step 442) before the expand function 312 exits.

Figure 9:
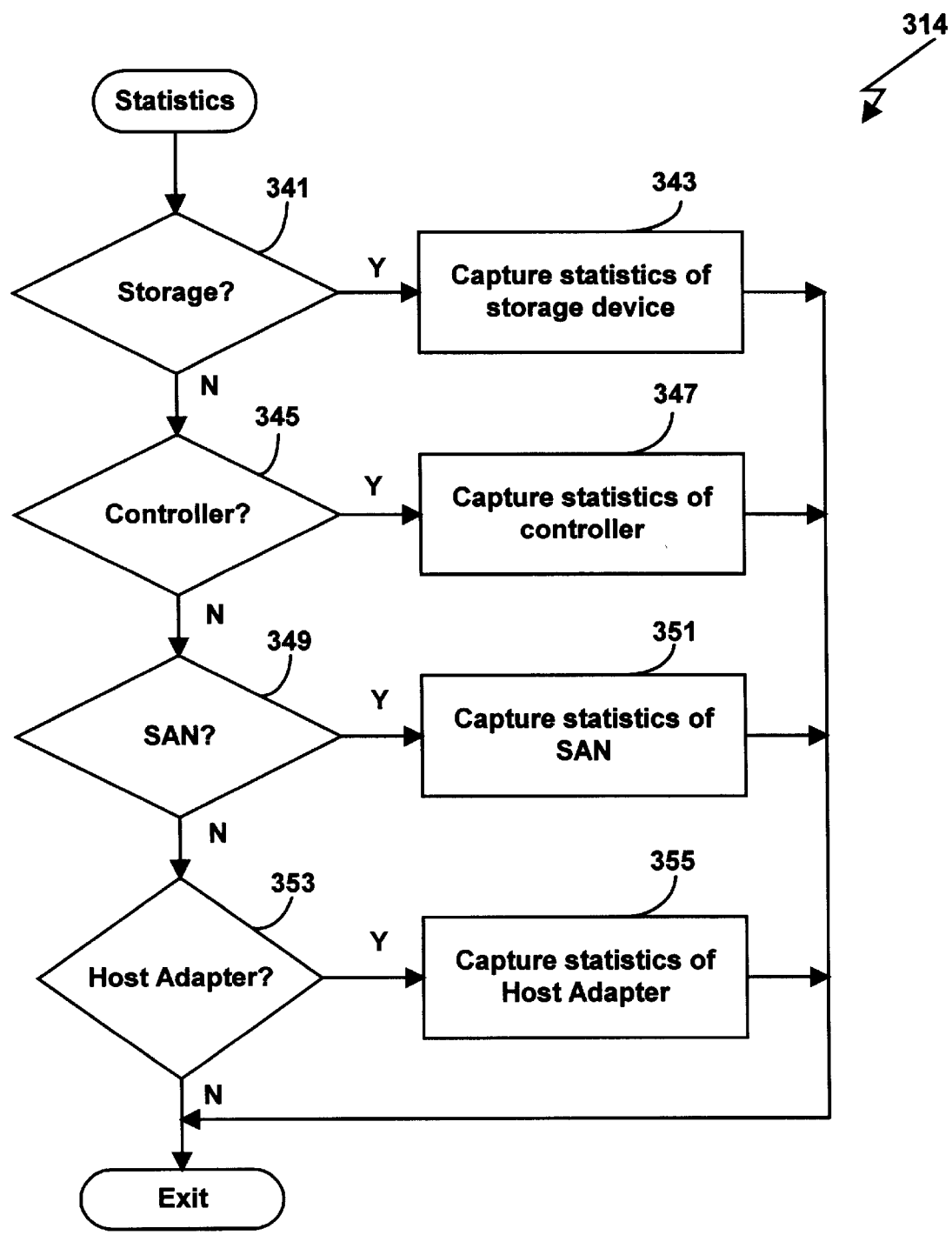
FIG. 9 is a flowchart illustrating a statistics gathering function.

Referring now to FIG. 9, the statistics function 314 is shown. First, the statistics function 314 checks whether information about the local storage device is to be kept (step 341) and if so, captures various statistics associated with the local storage device (step 343). Alternatively, the statistics function 314 checks whether the statistics on a controller are to be kept (step 345). If so, the appropriate information on the controller performance is captured (step 347). Alternatively, the statistics function 314 checks whether statistical data on the SAN devices are to be kept (step 349) and if so, SAN information is saved (step 351). Additionally, the statistics function 314 checks whether statistics on a host adapter are to be kept (step 353) and if so, saves statistical information on the host adapter performance (step 355).

Figure 10:
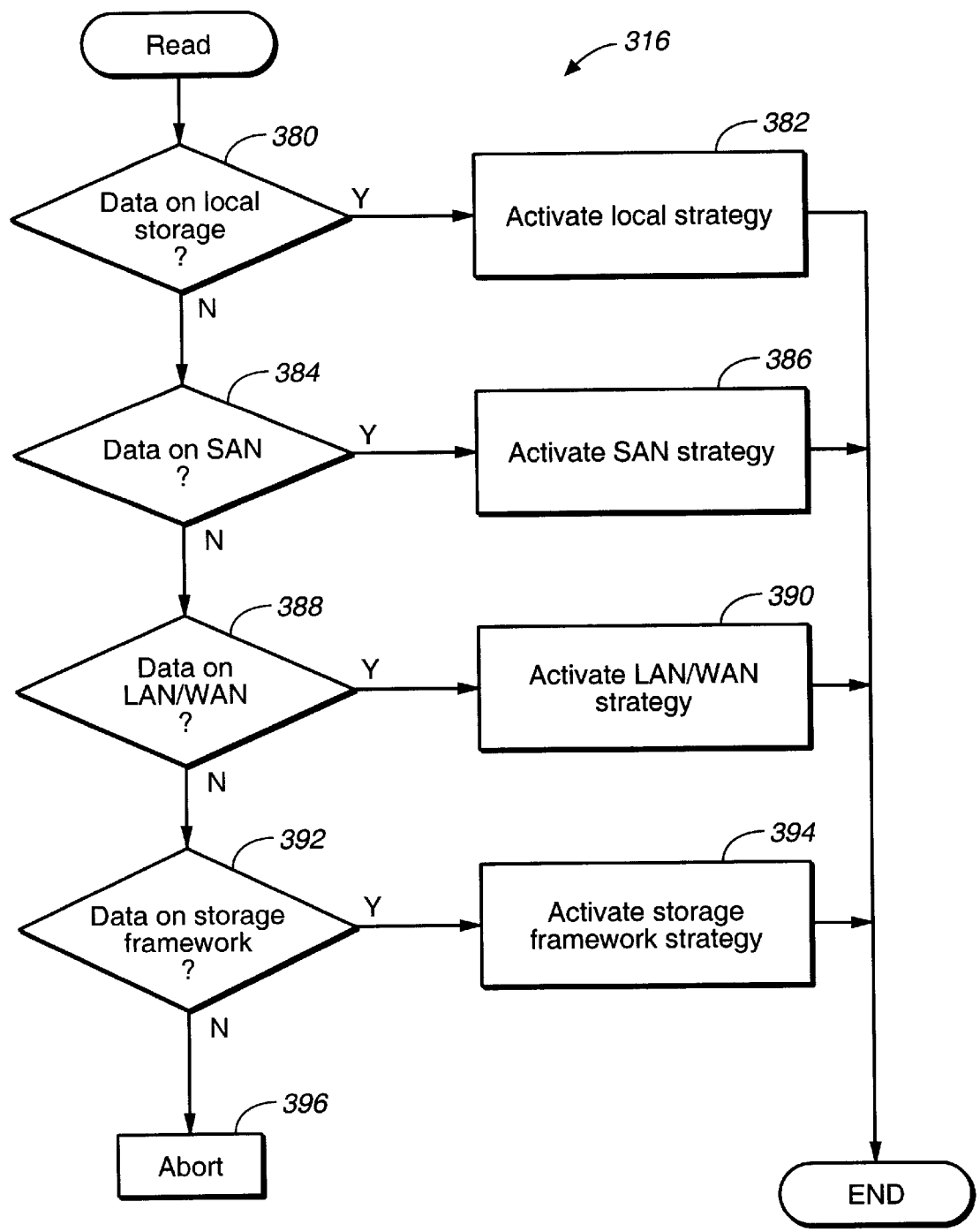
FIG. 10 is a flowchart illustrating a read operation.

Parameters collected for local storage devices may include:
1. Size of disk
2. Revolutions per Minute (RPM)
3. Cache
4. Cylinders
5. Heads
6. Serial number
7. Type—SCSI-I or II or III or Fibre Channel
 Parameters collected for the controller include:
1. Write Cache on controller
2. QOS
3. Current capacity
4. maximum capacity
5. Serial number
6. Maximum throughput
7. Type—SCSI-I or II or III or Fibre Channel
8. stripe sizes supported
 Parameters collected for SAN devices include:
1. RAID levels supported
2. QOS
3. Number of devices attached
4. Free volumes
5. Parameters of each volume
 Parameters collected for host adapters include:
1. QOS
2. Cache on controller
3. SCSI or Fibre channel Referring now to FIG. 10, the read function 316 is shown in more detail. First, the read function 316 checks whether data to be retrieved resides on the local storage device (step 380) and if so, activates the local strategy (step 382) before exiting. Alternatively, if the data to be read resides on the SAN (step 384), the read function 316 activates the SAN strategy (step 386) and exits. If the data to be read resides on the LAN/WAN (step 388), the read function 316 then activates the LAN/WAN strategy (step 390) and exits. Finally, the read function 316 determines whether the data to be accessed resides on the storage framework device (step 392) and if so, activates the storage framework strategy (step 394) before exiting. If the data to be retrieved does not reside on the local storage, the SAN, the LAN/WAN, or the storage framework, the read function 316 aborts its operation (step 396).

Figure 11:
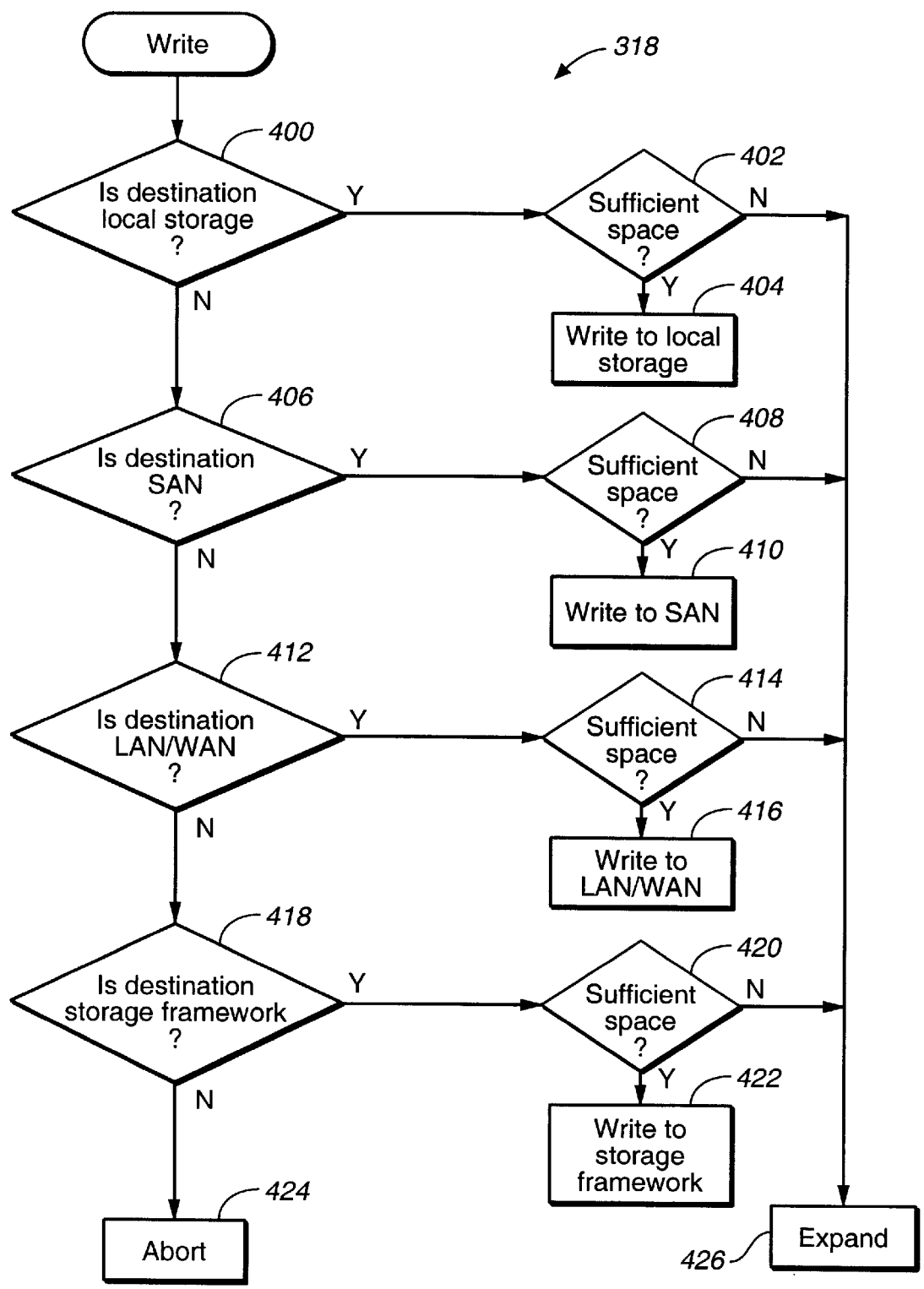
FIG. 11 is a flowchart illustrating a write function.

Referring now to FIG. 11, the write function 318 is shown. First, the write function checks whether data is destined to a local storage device (step 400). If so, the write function 318 checks whether sufficient space exists on the local storage device (step 402) and if so, sends the write to the local storage device (step 404). From step 402, if insufficient space exists, the write function 318 calls the expand function (step 426) and retries the write operation.

From step 400, if the destination is not to a local storage device, the write function 318 checks whether a destination is directed at a SAN device (step 406) and if so, the write function 318 checks whether sufficient space exists on the SAN device (step 408) and if not, calls for expand function 426. Alternatively, if sufficient space exists, the write function 318 writes data to the SAN device (step 410).

From step 406, if the destination is not to the SAN, the write function 318 checks whether the destination is to a LAN/WAN device (step 412). If so, the write function 318 checks whether sufficient space exists on the LAN/WAN device (step 414) and if not, calls the expand function (step 426). Alternatively, the write is forwarded to the LAN/WAN device (step 416).

From step 412, the write function 318 checks whether the destination is directed at a storage framework device (step 418). If so, the availability of space is checked (step 420) and if insufficient space exists, the expand function is called (step 426). Alternatively, writes are forwarded to the storage framework device (step 422). From step 418, in the event that the destination is not to a known storage device, the write function 318 aborts (step 424).

Figure 12:
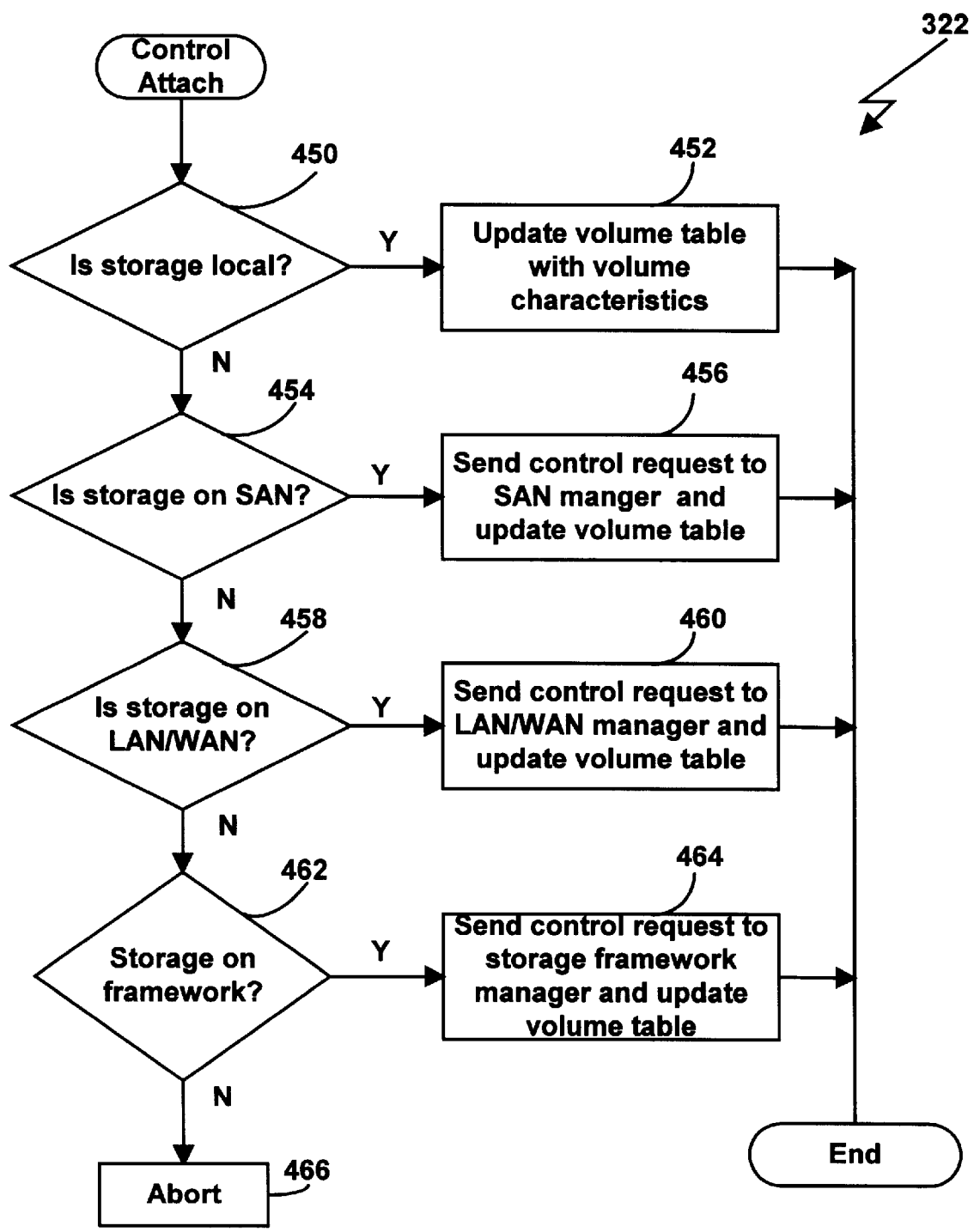
FIG. 12 is a flowchart illustrating a control attach function.

Referring now to FIG. 12, the control attach function 322 is illustrated. First, the attach function checks whether the device to be attached is a local storage device (step 450). If so, a volume table is updated with the local storage device characteristics (step 452). Alternatively, the attach function 322 checks whether the device resides on a SAN (step 454). If so, the attach function 322 sends a control request to the SAN manager and updates the volume table with the characteristics of the SAN storage device (step 456). From step 454, if the storage device does not reside on a SAN, the attach function 322 checks whether the storage device resides on a LAN/WAN (step 458) and if so, sends the control request to the LAN/WAN manager as well as updates the volume table (step 460). Alternatively, if the storage device is not on a LAN/WAN, the attach function 322 determines whether the storage device resides on a storage framework (step 462). If so, the attach function 322 sends a control request to the storage framework manager and updates the volume table with the characteristics of the storage device on the storage framework (step 464). From step 462, in the event that the device to be attached does not reside on any of the above environments, the attach function 322 aborts (step 466).

Figure 13:
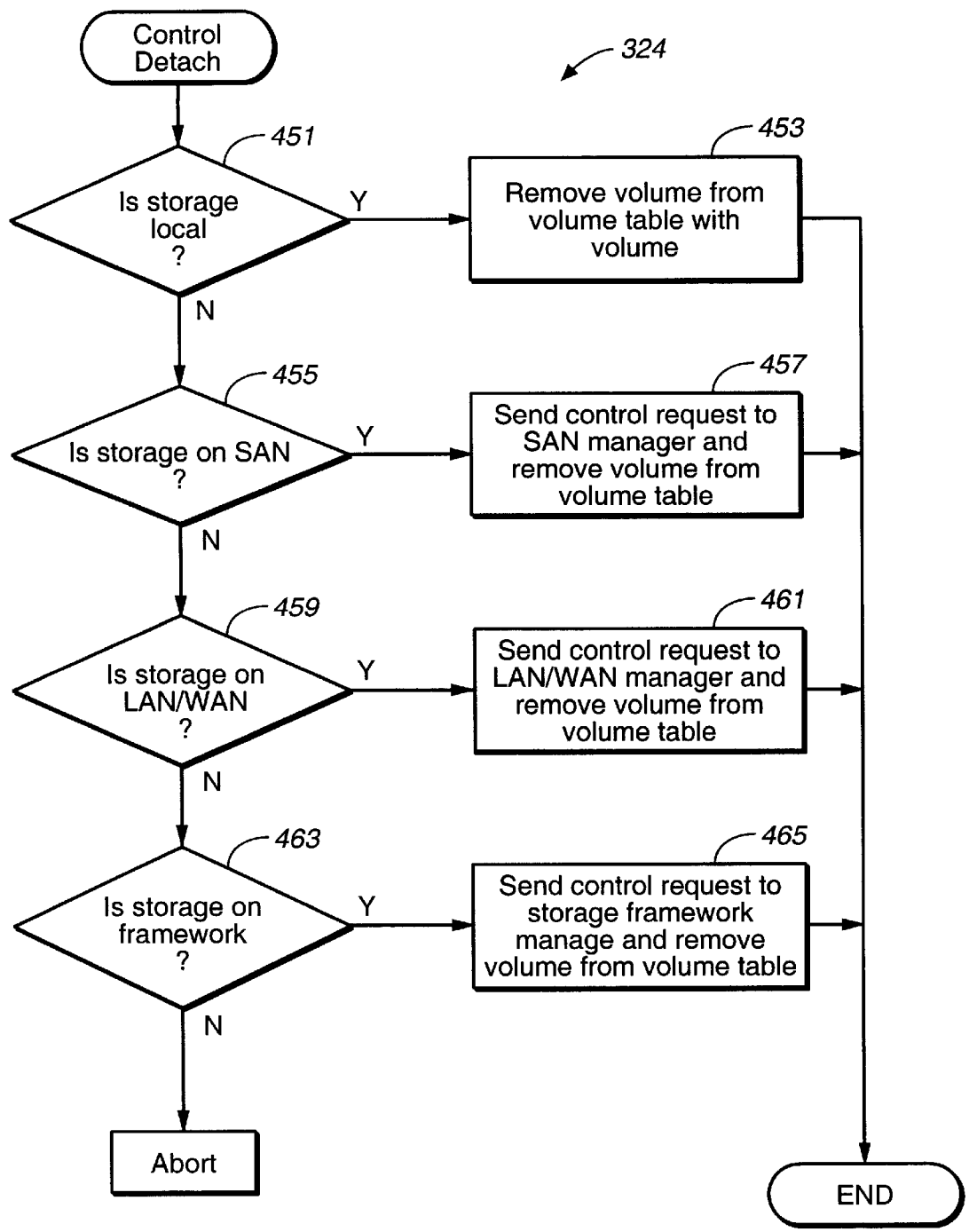
FIG. 13 is a flowchart illustrating a control detach function.

Referring now to FIG. 13, the corresponding detach function 324 is shown. The detach function is the inverse of the attach function and checks whether the device which has been requested to be detached is a local storage device (step 451) or whether the device resides on the SAN, LAN/WAN, or the storage framework (steps 455, 459, and 463). If so, the detach function 324 removes the volume from the respective manager and removes the information from the volume table (steps 453, 457, 461 and 465).

Figure 14:
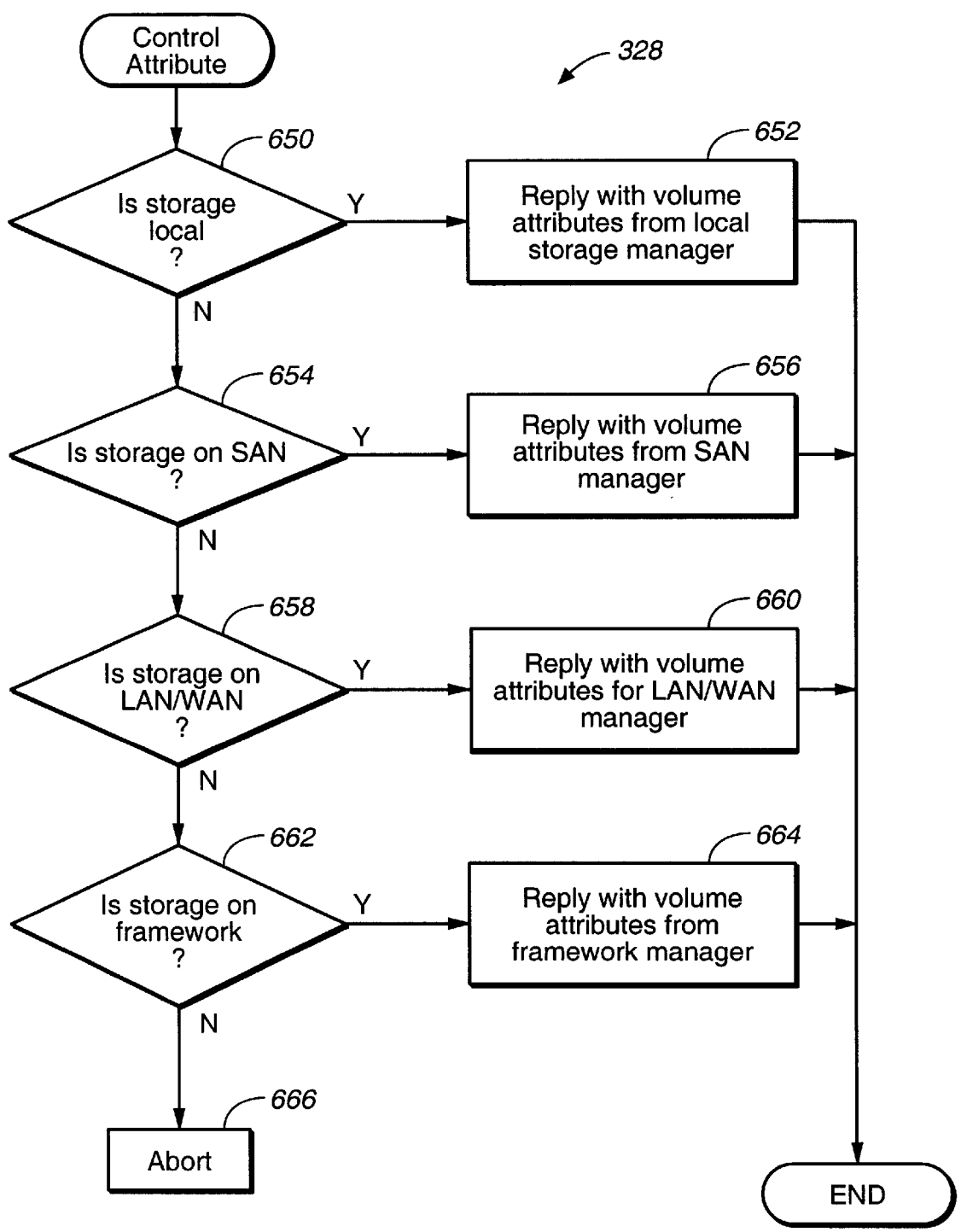
FIG. 14 is a flowchart illustrating a control attribute collection function.

Referring now to FIG. 14, the attribute function 326 is illustrated. The attribute function 326 sequentially checks whether the device whose attribute is being requested is a local storage device (step 650), a SAN device (step 654), a LAN/WAN device (step 658), or a storage framework device (step 662). If so, it queries and returns the volume attributes from the local storage manager (step 652), the SAN manager (step 656), the LAN/WAN manager (step 660) or from the framework manager (step 664), respectively. Similarly, the initialization function 332 sequentially goes through and initializes each data storage device that resides on the local storage device, the SAN, the LAN/WAN or the storage framework.

Figure 15:
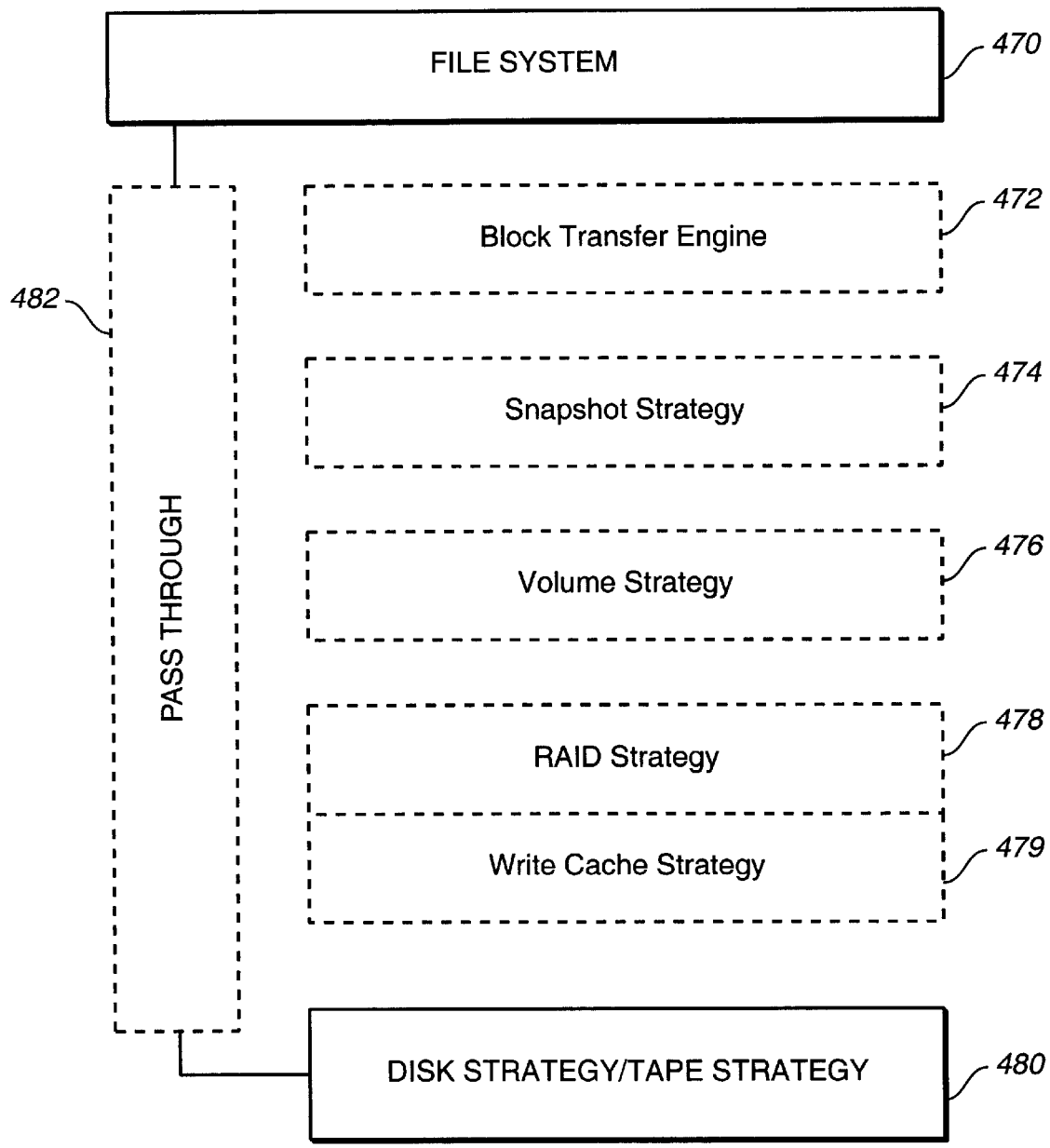
FIG. 15 is a block diagram illustrating a storage stack in an operating system.

Turning now to FIG. 15, a typical storage stack in an operating system is shown. In this operating system, a file system 470 manages the data storage devices. The file system communicates ultimately with a disk strategy/tape strategy 480 through a passthrough path 482. Between the file system 470 and the disk strategy/tape strategy 480 are a plurality of optional modules, including a block transfer engine module 472, a snapshot strategy module 474, a volume strategy module 476, a RAID strategy 478 which optionally includes a write cache strategy 479.

During operation in an embodiment, a layer such as an NFS layer calls an nfs_dispatch( ) function, which in turn calls an nfs_write( ) function. The file system 470 calls fp_write( ), which calls a node write operation function called vnode_ops→write( ) that calls:
1. disk_strategy( ) if the write has to go to a disk,
2. raid_strategy( ) if the write has to go to a RAID,
3. vp_strategy( ) if the write has to go to a volume,
4. snap_strategy( ) if the write has to go to a snapshot, or
5. tape_strategy( ) if the write has to go to a tape.

The raid_strategy( ) will call the disk_strategy( ) since the RAID is on the disk. Before calling the disk_strategy( ), the raid_strategy does an exclusive or function to determine parity errors.

The vp_strategy( ) can call either raid_strategy( ) or disk_strategy( ) since the member of a volume can be either a disk or a RAID array. Similarly, the snap_strategy( ) can call either vp_strategy( ) or raid_strategy( ) or disk_strategy( ) since the snapshot can be on a disk or a RAID or a Volume. In this manner, appropriate handling strategies are assigned to handle I/O requests before the actual I/O operations are sent to their respective data storage devices which may be a local drive, a SAN drive, a LAN/WAN drive or a storage framework drive.

A sample flow of data through various write calls during a write from an application, for example NFS, is shown below:

NFS_write( )→fs_write( )→bio_write( )→vp_strategy( )→raid5_strategy( )→disk_strategy( )

In this example, NFS generates a file system write which calls a block I/O (bio) write which calls the virtual partition strategy module, which calls the RAID strategy module 478, which in turn calls the disk strategy module 480 that actually writes the data to the disk. The virtual partition module can either stripe the data across all the members or can mirror data.

The following structure depicts a virtual partition:

```
typedef struct vpart {
       long          nparts;        /* Number of partitions
in vdisk */
       long          status;        /* partition status */
       long          oflags;        /* new flag: open for
writing */
       long          vp_type;       /* vpart type */
       long          vp_size;       /* total number of
sectors */
       long          stripe_size;   /* Stripe size in 512
byte blocks */
       dev_t         part_desc[MAX_VDISK_PARTS];   /*
Partition descriptions */
}VPART;
```

The RAID strategy module 478 is a part of a typical device switch structure

```
struct bdevsw{
    int   (*d_open)(dev_t*, int, int, struct cred*);
    int   (*d_close)(dev_t, int, int, struct cred*);
    void  (*d_strategy)(struct buf*);
    int   (*d_ioctl)(dev_t, int, int, int, struct cred*, int*);
    int   (*d_lookup_path)(char*, dev_t*);
    int   (*d_size)(dev_t);
    char  *d_name;
    void  *d_priv;
};
Enum VP_ATTR {
    VP_INIT,      /* initialize the virtual partition */
    VP_ATTATCH,   /* attach the virtual partition */
    VP_DETACH,    /* detach the virtual partition */
    VP_CONNECT,   /* connect the virtual partition */
    VP_BIND,      /* bind to the storage */
    VP_WRITE,     /* write data */
    VP_READ,      /* read data */
    VP_MOVE,      /* move data */
    VP_SIGNAL,    /* signal events */
    VP_QUERY,     /* query the virtual partition, can also run discovery */
    VP_CONVERT,   /* data format conversion */
    VP_CONTROL,   /* control point */
    VP_CALLBACK,  /* call back function */
    VP_MISC1,     /* miscellaneous, user defined */
    VP_MISC2,
    VP_MISC3,
    VP_MISC4,
};
Additionally, a structure vpops{ } is defined to support the
above attributes as follows:
Struct vpops {
    Vp_init( ),
    Vp_attach( ),
    Vp_detach( ),
    Vp_connect( ),
    Vp_bind( ),
    Vp_write( ),
    Vp_read( ),
        Vp_move( ),
        Vp_signal( ),
    Vp_query( ),
    Vp_convert( ),
    Vp_control( ),
    Vp_callback( ),
    Vp_misc1( ),
    Vp_misc2( ),
```

-continued

```
    Vp_misc3( ),
    Vp_misc4( ),
};
```

To achieve intelligent virtual partitions that can work on SANs, remote data synchronization, disjoint members, device to device data movement, backup, among others, a new virtual partition attribute table is defined as follows:

```
Enum VP_ATTR {
    VP_INIT, /* initialize the virtual partition */
    VP_ATTATCH, /* attach the virtual partition */
    VP_DETACH, /* detach the virtual partition */
    VP_CONNECT, /* connect the virtual partition */
    VP_BIND, /* bind to the storage */
    VP_WRITE, /* write data */
    VP_READ, /* read data */
    VP_MOVE, /* move data */
    VP_SIGNAL, /* signal events */
    VP_QUERY, /* query the virtual partition, can also run
        discovery */
    VP_CONVERT, /* data format conversion */
    VP_CONTROL, /* control point */
    VP_CALLBACK, /* call back function */
    VP_MISC1, /* miscellaneous, user defined */
    VP_MISC2,
    VP_MISC3,
    VP_MISC4
};
```

Additionally, a structure vpops{ } is defined to support the above attributes:

```
Struct vpops {
    Vp_init( ),
    Vp_attach( ),
    Vp_detach( ),
    Vp_connect( ),
    Vp_bind( ),
    Vp_write( ),
    Vp_read( ),
    Vp_move( ),
    Vp_signal( ),
    Vp_query( ),
    Vp_convert( ),
    Vp_control( ),
    Vp_callback( ),
    Vp_misc1( ),
    Vp_misc2( ),
    Vp_misc3( ),
    Vp_misc4( )
};
```

The above virtual partition structure is redefined for the intelligent virtual partition model as follows:

```
typedef struct vpart {
    long        nparts;     /* Number of partitions
in vdisk */
```

-continued

```
    long            status;         /* partition status */
    long            oflags;         /* new flag: open for
writing */
    long            vp_type;        /* vpart type */
    long            vp_size;        /* total number of
sectors */
    long            stripe_size;    /* Stripe size in 512
byte blocks */
    VPDESC          vp_desc[MAX_VDISK_PARTS];  /* Partition
descriptions */
}VPART;
typedef struct vpdesc {
    long type;              /* vp type */
    long status;            /* status of the VP */
    vpops ops;              /* operations as defined above */
    void func();            /* post operative function */
}VPDESC;
```

VP_ATTACH allows higher layers to connect to the storage device on the SAN.

To illustrate, an exemplary configuration shown in FIG. 8 for video streaming applications will be discussed next. In this video streaming example, a video data provider might choose to play advertisements periodically which cannot be fast-forwarded by a user. The advertisement can be a pointer that stores the actual location of the data. This location can be another member of the virtual partition. When the user fast-forwards the video and tries to read beyond the advertisement, the vp_strategy module can detect this bypass attempt and route the advertisement to the user.

Figure 16:
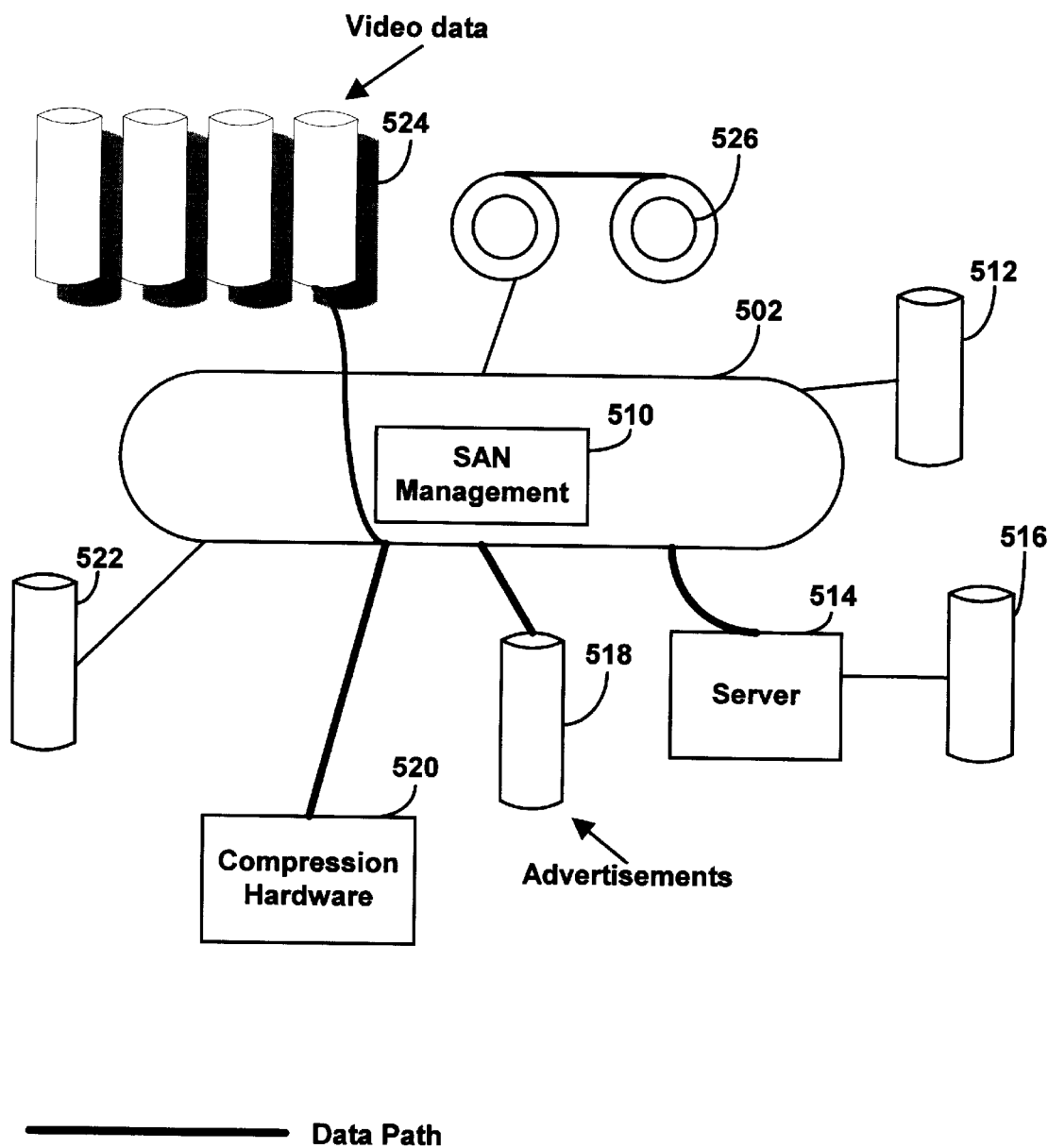
FIG. 16 is a diagram illustrating an exemplary operation of a SAN network in accordance with the invention.

Briefly, in an embodiment 500 of FIG. 16, data requests from users are transmitted to one or more servers 514 which have local drives 516. The server 514 is connected over a SAN bus 502 to a plurality of data storage devices 512, 518, 522, 524 and 526. Additionally, a compression unit 520 is connected to the SAN bus 502. Storage space requests by the server 514 are managed by a SAN manager 510.

In this embodiment, the video data is put on four RAID0 stripes residing in the data storage device 524 which may be eight disks each, for example. The virtual partition thus has four data storage devices, each of type RAID0 and which reside on the SAN bus 502. The storage device 518 contains pointers to all the advertisements residing on the separate RAID5 array 524. Now, the virtual partition has five data storage members in the SAN.

The vpart.status and vpdesc.status will be in a "START" state initially. When the first data write or read comes in, a vp_init module is called for each of the data storage devices (members) which put the members in a "INIT" state and the virtual partition also in a "INIT" state. Now since the member is in a SAN, a connect module of that member may be used to connect the disk array 524 on to the data path. Moreover, if the video streaming uses compression hardware 520 on the SAN, the control( ) function may be used to hook the compression hardware to the data path. The read function can detect if an advertisement is due and can use the move function to get hold of the advertisement data, which is on a different member.

The above example can also be used for remote data mirroring. For instance, one member of the mirror can be a RAID5 array that is local on the SAN while the other array can be remote on a WAN. In that case, the vp_write( ) of that member will write the data on the WAN using NFS/

TCP/IP, for example. Vp_write then uses callback( ) to setup and terminate TCP connections. In a backup or a snapshot application, the strategy or the write function can store the catalog or the bit-map/re-map data in a separate member. This can be either a disk or a NVRAM. The above architecture also works for a non-SAN systems as well.

The above described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

Other embodiments are within the scope of the following claims.

What is claimed is:

1. A method for managing storage space in one or more data storage devices coupled to a storage area networks (SAN), the method comprising:
    receiving a request for storage space from a requester coupled to the SAN, the request specifying one or more criteria associated with the requested storage space;
    selecting one of the data storage devices according to volume characteristics of the devices, where the selected device is a device having volume characteristics that best match the one or more criteria specified in the request;
    returning an identification associated with the selected data storage device to the requester; and
    creating a communication path between the requester and the selected data storage device.

2. The method of claim 1, wherein the searching step is performed by an external manager.

3. The method of claim 1, wherein the volume characteristics of a data storage device are statically configured in a server.

4. The method of claim 1, wherein the volume characteristics of a data storage device are statically configured in a switch.

5. The method of claim 1, wherein each data storage device broadcasts its volume characteristics to a manager.

6. The method of claim 5, wherein the manager stores the volume characteristics of a data storage device in the table.

7. The method of claim 5, wherein the manager statically configures the volume characteristics of a data storage device.

8. The method of claim 5, wherein each data storage device broadcasts value-added services associated with the data storage device to the manager.

9. The method of claim 5, wherein the manager communicates with each data storage device using a Fibre Channel protocol.

10. The method of claim 5, wherein the manager manages one or more virtual volumes on each data storage device.

11. The method of claim 5, wherein the requester and the data storage devices communicate using a network protocol.

12. The method of claim 11, wherein the network protocol is an Internet Protocol (IP).

13. The method of claim 11, wherein the network protocol is an Asynchronous Transfer Mode (ATM) protocol.

14. The method of claim 11, wherein the network protocol is an in-band control protocol.

15. The method of claim 14, wherein the network protocol is a Small Computer System Interface (SCSI) protocol.

16. The method of claim 1, wherein the data storage device is managed by a server.

17. The method of claim 16, wherein the server communicates using a Fibre Channel protocol.

18. The method of claim 1, wherein the data storage device is managed by a switch.

19. The method of claim 18, wherein the switch communicates using a Fibre Channel protocol.

20. The method of claim 5, wherein the manager communicates with another manager over a network.

21. The method of claim 1, wherein one of the data storage devices is a disk drive.

22. The method of claim 1, wherein one of the data storage devices is a tape drive.

23. The method of claim 1, wherein the identification is a logical unit number.

24. The method of claim 1, wherein the requester is a server.

25. The method of claim 1, further comprising performing manager operations to allocate space.

26. The method of claim 25, wherein the manager operations include one operation selected from a group of commands to initialize, attach, detach, connect, bind, write, read, move, signal, query, convert, control, and callback data in a storage partition.

27. A system comprising:
    a storage area networks (SAN);
    one or more data storage devices coupled to the SAN;
    a requester coupled to the SAN; and
    a manager for supervising requests for storage space, the manager being operable to:
        receive a request for storage space from the requester, the request specifying one or more criteria associated with the requested storage space;
        select one of the data storage devices according to volume characteristics of the devices, where the selected device is a device having volume characteristics that best match the one or more criteria specified in the request;
        return an identification associated with the selected data storage devices to the requester; and
        create a communication path between the requester and the selected data storage device.

28. The system of claim 27, wherein the system has two or more SANs and the two or more SANs are interconnected.

29. The system of claim 28, wherein the two or more SANs are interconnected over a network.

30. The system of claim 27, wherein the two or more SANs are interconnected using a router.

31. The system of claim 27, wherein the manager conforms to a virtual volume management protocol.

32. The system of claim 31, wherein the manager controls one or more virtual partitions.

33. The system of claim 27, wherein the manager resides on a switch.

34. The system of claim 33, wherein the manager resides on a network switch.

35. The system of claim 33, wherein the switch is a Fibre Channel switch.

36. The system of claim 27, wherein one or more of the data storage devices are coupled to the requester.

37. The system of claim 27, wherein one or more of the data storage devices are coupled to the requester over the SAN.

38. The system of claim 27, wherein one or more of the data storage devices are coupled to the requester over a local area network.

39. The system of claim 27, wherein one or more of the data storage devices are coupled to the requester over a wide area network.

40. The system of claim 27, wherein one or more of the data storage devices are coupled to the requester over a storage framework.

41. The system of claim 40, wherein the storage framework is StoreX.

42. The system of claim 27, wherein the manager allocates storage space.

43. The system of claim 42, wherein the storage space is allocated using one or more commands selected from a group of commands to initialize, attach, detach, connect, bind, write, read, move, signal, query, convert, control, and callback data in a storage partition.

* * * * *

UNITED STATES PATENT AND TRADEMARK OFFICE
CERTIFICATE OF CORRECTION

PATENT NO.     : 6,389,432 B1
DATED          : May 14, 2002
INVENTOR(S)    : Srinivas Pothapragada, Lakshman Narayanaswamy, Pannala Sudhakar Reddy, Ravi Indurkar and Tarun Kumar Tripathy It is certified that error appears in the above-identified patent and that said Letters Patent is hereby corrected as shown below:

<u>Title page,</u>
Item [56], References Cited, please add the following US references:
-- 5,548,740      02/1993        Kiyohara ……………..345/543
   5,675,778      11/1994        Jones…………………..707/104
   6,038,668      7/1998         Chipman et al. ………..713/201
   6,057,863      10/1997        Olarig………………….345/520
   6,078,990      2/1998         Frazier…………………..711/114
   6,154,765      3/1998         Hart……………………..709/201
   6,157,935      12/1996        Tran et al……………….707/503
   6,185,203      2/1997         Berman………………….370/351
   6,199,146      3/1998         Pence…………………...711/154 --
Last entry under "Publications", please delete "form" and insert -- from -- therefor.

Signed and Sealed this

Nineteenth Day of November, 2002

*Attest:*

*Attesting Officer*

JAMES E. ROGAN
*Director of the United States Patent and Trademark Office*